W. T. BEEKMAN.
Car-Starters.

No. 148,654. Patented March 17, 1874.

WITNESSES:
Chas. Nida
Alex F. Roberts

INVENTOR:
W. T. Beekman
BY
ATTORNEYS.

UNITED STATES PATENT OFFICE.

WILLIAM T. BEEKMAN, OF PETERSBURG, ILLINOIS.

IMPROVEMENT IN CAR-STARTERS.

Specification forming part of Letters Patent No. 148,654, dated March 17, 1874; application filed December 6, 1873.

*To all whom it may concern:*

Figure 1:
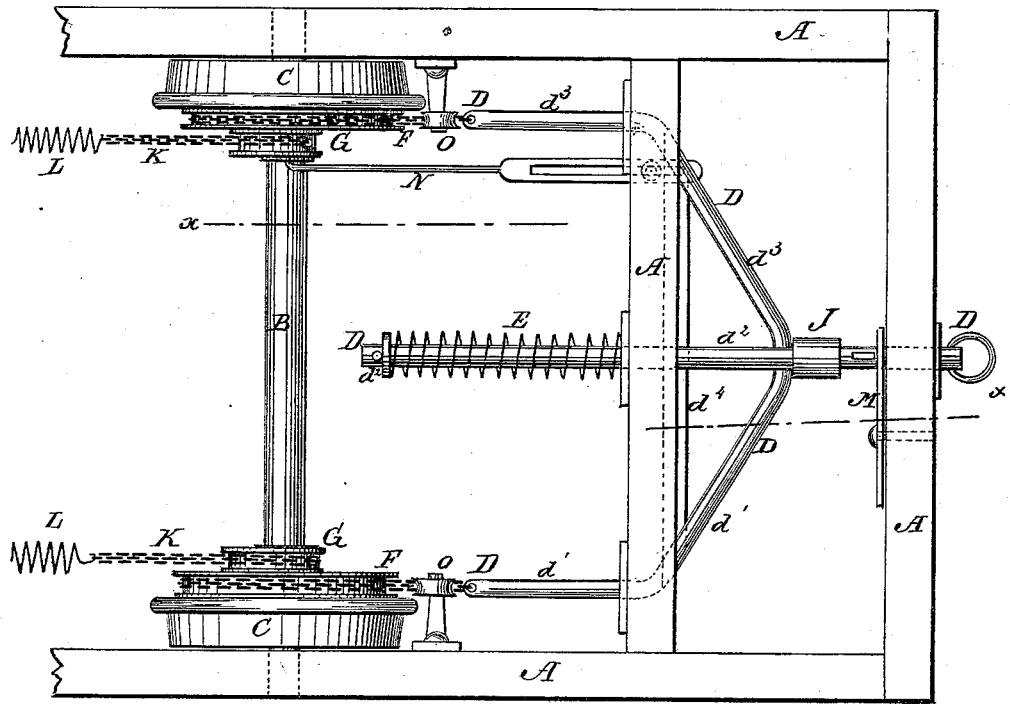
Figure 2:
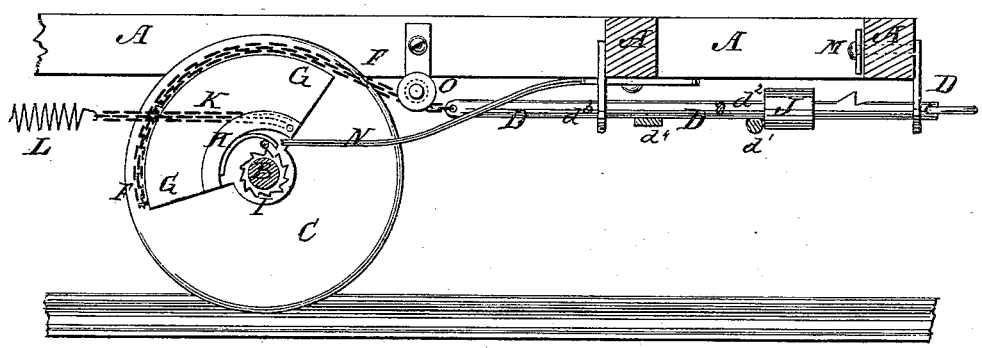

Be it known that I, WILLIAM T. BEEKMAN, of Petersburg, in the county of Menard and State of Illinois, have invented a new and useful Improvement in Draft Attachment for Street-Cars, of which the following is a specification:

Figure 1 is a top view of a part of a car-truck or frame to which my improvement has been applied. Fig. 2 is a detail section of the same taken through the line $x$ $x$, Fig. 1.

Similar letters of reference indicate corresponding parts.

The invention relates to improvements in car-starters of the class in which the draft is applied to a segment pivoted on the axle, and so arranged as to be connected therewith by a pawl and ratchet when moving or rotating forward, and to be disconnected when moving backward. The improvement consists in the combination and arrangement of a draft-bar of peculiar construction with segments placed contiguous to or against the inner sides of the wheels, so that they may take up no extra space but project upward into the same box with the wheels. It consists, also, in stops with the wheels arranged to lift the pawls off the ratchet-wheels when the segments rotate backward, as hereinafter more fully set forth.

A represents the truck or car-frame with which the axles B and the wheels C are connected in the ordinary way. D is the bar or frame, to the forward end of which the draft is applied, and which slides longitudinally in keepers attached to the truck or car-frame A. The rear part of the frame D is made with three branches, $d^1$ $d^2$ $d^3$, the central one $d^2$ of which is provided with a metallic or rubber spring, E, to draw back the draft-bar when the strain is relaxed. The side branches $d^1$ and $d^3$ incline outward, and then project to the rearward parallel with each other and with the planes of the wheels C, and in such positions that, if extended, they would pass along the inner sides of said wheels C, near the bottom of the car or truck-frame. The branches $d^1$ $d^2$ $d^3$ of the draft-bar D are connected and strengthened by a cross-bar, $d^4$, which prevents them from contracting under strain and enables them to be made lighter than they otherwise could be, and have the requisite strength. To the rear ends of the side branches $d^1$ and $d^3$ are attached the forward ends of short chains F, or their equivalents, which pass along the grooves of the larger parts of the segments of double pulleys G, and their rear ends are attached to the rear parts of said segments G. The segments G ride loosely upon the axles B at the inner sides of the wheels C, and are provided with pawls H, which engage with the teeth of the small ratchet-wheels I attached to the axle B. The segments G are made of about the same diameter as the wheels C, so that both may project up into the segmental boxes, which are ordinarily employed to cover wheels of street-cars, being for that purpose located beneath the seats. Said boxes are nearly always made of more than double the width of the car-wheel, and the employment of the segment will not require it to be increased.

By this construction the draft is applied near the rims of the wheels and directly above the axle, and the point of greatest leverage is thus obtained to start the car by turning the wheels and axles, instead of being applied to the body of the car or to the truck-frame.

The forward part of the draft-bar D is provided with a rubber-block, J, which strikes against a cross-bar of the frame A, and thus sustains the draft and prevents recoil. To the forward parts of the pulley-segments G are attached the ends of short chains K or equivalents, which pass back along the grooves of the smaller parts of the said segments, and to their rear ends are attached springs L, which are connected with the truck or car-frame A, so that as soon as the draft-strain may be relaxed after starting the car, and, in connection with the spring E, to draw back the segments G and draft-bar D ready to be again used for again starting the car. If desired, the springs L may be omitted and the rear sides of the segments G weighted, to draw back said segments and draft-bar. As the draft-bar is drawn back a lever-catch, $m$, drops in front of a shoulder or projection formed upon said draft-bar, so as to sustain the draft under ordinary circumstances, the catch $m$ being so arranged that it may be raised by the driver with his foot, or may be otherwise operated when about to start the car to allow the device to act. The pawls H should be provided with stops N to raise them away from the ratchet-wheels I when the segments G are drawn back to prevent said pawls from being worn by the ratchet-wheels I when the said segments have been drawn back. The chains E may be provided with guide-pulleys O, to guide said chains to the bottom of the truck, or insure their passing properly upon the grooves of the segments G, when the said segments and the draft-bar are being drawn back.

Having thus described my invention, I claim as new and desire to secure by Letters Patent—

1. The sliding draft-bar D, formed of the central part $d^2$ and the bent arms $d^3$ joined thereto, the chain F, grooved segments G, and pawl-and-ratchet mechanism, combined with the axle B and wheels C of the car, as shown and described.

2. The combination of the stops N with the pawls H, ratchet-wheels I, and pulley-segments G, substantially as shown and described, and for the purpose set forth.

WILLIAM T. BEEKMAN.

Witnesses:
   T. B. MOSHER,
   C. SEDGWICK.